US006839025B1

(12) United States Patent
Reigle (10) Patent No.: US 6,839,025 B1
(45) Date of Patent: Jan. 4, 2005

(54) PRECISION DIRECTION FINDING SENSING SYSTEMS AND METHODS

(76) Inventor: Ken Reigle, 333 River St., Apt. 252, Hoboken, NJ (US) 07030

( * ) Notice: Subject to any disclaimer, the term of this patent is extended or adjusted under 35 U.S.C. 154(b) by 0 days.

(21) Appl. No.: 10/452,321

(22) Filed: Jun. 2, 2003

Related U.S. Application Data (60) Provisional application No. 60/385,667, filed on Jun. 3, 2002.

(51) Int. Cl.[7] ................................................. G01S 5/02
(52) U.S. Cl. ........................ 342/417; 342/420; 342/424
(58) Field of Search ................................ 342/417, 424, 342/442, 444, 445

(56) References Cited

U.S. PATENT DOCUMENTS

| | | | |
|---|---|---|---|
| 5,381,150 A | * | 1/1995 | Hawkins et al. ............. 342/13 |
| 5,579,011 A | * | 11/1996 | Smrek ........................ 342/113 |
| 5,592,181 A | * | 1/1997 | Cai et al. .................... 342/457 |
| 5,608,411 A | * | 3/1997 | Rose .......................... 342/417 |

* cited by examiner

Primary Examiner—Dao Phan
(74) Attorney, Agent, or Firm—St. Onge Steward Johnston & Reens LLC (57) ABSTRACT

Methods and systems are provide for precision direction finding capabilities for a sensing system, the method comprising providing a sensing system that utilizes an amplitude direction finding scheme, receiving a received signal in at least two receivers of the energy wave sensing system, the received signal generated by a first object, comparing the received signal at each receiver in a processor of the sensing system utilizing an amplitude direction finding technique to produce amplitude direction finding technique data, the amplitude direction finding technique data indicative of course direction of the first object, processing the received signal further to determine angle of arrival data based on an interferometric technique to produce interferometric technique data, the interferometric data indicative of a more precise direction of the first object than provided by the amplitude direction finding technique and determining the direction finding data of the first object based on a residual phase error of the interferometric technique data and on an amplitude direction finding error of the amplitude direction finding technique data.

48 Claims, 5 Drawing Sheets

PRECISION DIRECTION FINDING SENSING SYSTEMS AND METHODS

Applicant claims priority benefits under 35 U.S.C. §119 (e) of U.S. Provisional Patent Application Serial No. 60/385,667 filed Jun. 3, 2002.

Request for Non-publication

The applicant request that the application not be published and the applicant certifies that the application is not and will not be the subject of an application filed in another country, or under a multilateral international agreement, that requires eighteen-month publication.

FIELD OF THE INVENTION

The present invention relates to systems and methods for active and/or passive sensing of an object, tracking of the object and forecasting the times and location of the object at a future time using a precision direction finding sensing system.

BACKGROUND OF THE INVENTION

High precision direction finding is important for many reasons, the most important of which is that accuracy is directly related to the utility of a sensing system. For example, military sensing systems generally have the most accurate direction finding systems because the consequences of failure to accurately track a hostile threat are very high. In contrast, civilian sensing systems are generally not as accurate because the threat is generally not hostile and thus there is cooperation between the parties, e.g. communications between commercial airliners and the control tower. However, all sensing and non-sensing users could benefit from more accurate direction finding sensing systems for commercial, political and safety reasons.

For instance, deterioration of stability in different parts of the world has lead to a proliferation of cheap and unsophisticated weapons introduced into the world market that pose a serious safety risk to the general populace of the world, e.g. the threat posed by terrorists with shoulder fired surface to air missiles endangering airline passengers. Another example of the need for more accurate direction finding sensing systems is presented by the presence of rogue states that develop sophisticated and unsophisticated weapons that target civilian populations as well as military targets, e.g. weapons of mass destruction. Furthermore, even nature poses threats that can be better addressed by more accurate direction finding sensing systems, e.g. a possible asteroid collision with the Earth.

To address the present need for more accurate direction finding sensing systems, numerous attempts to improve the accuracy of precision direction finding systems have been attempted. For example, interferometers have generally been used in direction finding when a high level of accuracy is required but interferometric techniques used for precision direction finding sensing systems have two major limitations.

The first limitation is that the cost and complexity of the system increases dramatically as the accuracy of the system is increased. For example, one way of increasing the accuracy of a direction finding system is to expand the aperture because the more accurately the sensing must locate the object illuminated, the narrower the locating beam must be.

One way that the aperture is expanded in an array sensing system is by increasing the number of elements in the array. These additional elements added to the array sensing system add cost and complexity as well as the sought after increase in system accuracy. The increase in cost and complexity comes from the additional elements added to the array, the complex switching network to control the enlarged array and the increased in processing needs of the system to compensate for the increase data flow generated by the enlarged array.

And the second limitation for precision direction finding sensing systems using interferometric techniques is that the data collected is highly ambiguous because multiple angle-of-arrivals are possible for any measured phase delta. This ambiguity has to be resolved in order to locate and/or track the object being illuminated by the direction finding sensing. This again adds cost and complexity because the presently available techniques to resolve the ambiguity are resource intensive and slow.

Consequently, the what is needed is a system and method to produce a more accurate direction finding sensing system, which is less costly and complex than comparably accurate direction finding sensing system presently available thereby providing accurate intercept and/or collision avoidance data. What is also needed is a way to reduce the aperture size of a phased array sensing system without adding significant cost and complexity. In addition, what is needed is a way to quickly and efficiently resolve the ambiguity problem presented by the use of the interferometric technique as well as a way to utilize the direction finding techniques using a plurality of energy sensing systems that utilize energies such as electromagnetic, acoustic, magnetic, seismic and the like.

SUMMARY OF THE INVENTION

Accordingly, it is an object of the present invention to provide a highly precise direction finding sensing system that is less costly and complex than comparable precise direction finding sensing systems.

Another object of the invention is to provide a novel method of resolving the ambiguities presented by interferometic techniques in direction finding sensings.

A further object of the invention is to provide a highly precise direction finding sensing system that has a reduced aperture size but is less costly and complex when compared to other comparably accurate precision direction finding sensing systems.

Still another object of the invention is to provide a highly accurate precision direction finding system for active and/or passive targeting.

Still yet another object of the invention is to provide a highly accurate precision direction finding system that will promote stealth characteristics by lowering the radar cross section by reducing the array's physical size and by canting the array's boresight.

And still a further object of the invention is to provide increased probability of object of interest intercept and reduced reaction time.

And Still yet another object of the invention is to establish highly precise targeting of any object of interest, regardless of movement, thereby enabling the fire control of speed of light weapons.

These and other objects of the present invention are achieved by provision of a sensing system with direction finding capabilities, the system comprising a phased array that utilizes an amplitude direction finding scheme, said phased array sensing having at least two receiver antennas for receiving a received signal from a first object, at least one processor in communication with the phased array sensing, the processor executing an amplitude direction finding technique module executing on the processor, the amplitude direction finding technique module producing amplitude direction finding technique data from the received signal, the amplitude direction finding technique data indicative of the course direction of the first object and an interferometric technique module to produce interferometric technique data from the received signal, the interferometric technique data indicative of a more precise direction of the first object than provided by the amplitude direction finding technique and a direction finding module executing on the processor, the direction finding module determining direction finding data of the first object based on a residual phase error of the interferometric technique data and on an amplitude direction finding error of the amplitude direction finding technique data.

Preferably, the system further comprising a user interface in communication with the processor, the user interface providing a user access to the direction finding data, a tracking module executing on the processor, the tracking module tracking the first object for a period of time based on the direction finding data, a guidance module executing on the processor, the guidance module guiding a second object to the first object based on the first object direction finding data, a forecast module executing on the processor, the forecast module providing forecast data of the future location of the first object based on the direction finding data and a projected first object course, an intercept module in communications with the processor, the intercept module guiding a second object to the first object based on the forecast data of the first object's future location, a collision avoidance module in communications with the processor, the collision avoidance module guiding a second object around the first object based on the forecast data of the first object's future location, a switching network operating under the direction of the processor, the switching network providing the optimal receiving antennas configuration for a center frequency that is being received, a phase interferometer in communication with the processor, the phase interferometer providing interferometer data indicative of the first object's direction from the phased array sensing, at least one radiating antenna in communication with the processor, the radiating antenna for radiating radiation onto a first object.

Other objects of the present invention are achieved by provision of a method of providing precision direction finding capabilities for a phased array sensing system, the method comprising providing a phased array sensing system that utilizes an amplitude direction finding scheme, receiving a received signal from a first object in at least two receiver antennas of the phased array sensing system, comparing the received signal at each receiver element in a processor of the phased array sensing utilizing an amplitude direction finding technique to produce amplitude direction finding technique data, the amplitude direction finding technique data indicative of the direction of the first object, processing the received signal further to determine angle of arrival data based on an interferometric technique to produce interferometric technique data, the interferometric technique data indicative of a more precise direction of the first object than provided by the amplitude direction finding technique and determining the direction data of the first object based on a residual phase error of the interferometric technique data and on an amplitude direction finding error of the amplitude direction finding technique data.

Preferably, the method further comprising radiating electromagnetic radiation from at least one radiating antenna of the phased array sensing system onto a first object, tracking the first object for a period of time based on the direction finding data, guiding a second object to the first object based on the first object direction finding data, establishing forecast data of a future location of the first object based on the direction finding data and a projected first object course, guiding a second object to the first object based on the forecast data of the first object's future location, avoiding the first object based on the forecast data as utilized by a second object, providing a switching network operating under the direction of the processor, the switching network providing the optimal receiving antennas configuration for a center frequency that is being received.

Still other objects of the present invention are achieved by provision of a method of precision direction finding capabilities for a sensing system, the method comprising providing a sensing system that utilizes an amplitude direction finding scheme, receiving a received signal in at least two receivers of the energy wave sensing system, the received signal generated by a first object, comparing the received signal at each receiver in a processor of the sensing system utilizing an amplitude direction finding technique to produce amplitude direction finding technique data, the amplitude direction finding technique data indicative of course direction of the first object, processing the received signal further to determine angle of arrival data based on an interferometric technique to produce interferometric technique data, the interferometric data indicative of a more precise direction of the first object than provided by the amplitude direction finding technique and determining the direction finding data of the first object based on a residual phase error of the interferometric technique data and on an amplitude direction finding error of the amplitude direction finding technique data.

Preferably, the method further comprising radiating energy from at least one radiating antenna of the sensing system onto a first object, tracking the first object for a period of time based on the direction finding data, guiding a second object to the first object based on the first object direction finding data, establishing forecast data of a future location of the first object based on the direction finding data and a projected first object course, guiding a second object to the first object based on the forecast data of the first object's future location, avoiding the first object based on the forecast data as utilized by a second object, providing a switching network operating under the direction of the processor, the switching network providing the optimal receiving antennas configuration for a center frequency that is being received.

Other objects, features and advantages according to the present invention will become apparent from the following detailed description of certain advantageous embodiments when read in conjunction with the accompanying drawings in which the same components are identified by the same reference numerals.

DETAILED DESCRIPTION OF CERTAIN ADVANTAGEOUS EMBODIMENTS

The present invention relates to methods and systems for a highly precise direction finding in sensing systems. Sensing systems include systems such as active radar, passive radar, bi-static radar, acitve sonar, passive sonar, passive coherent location and the like. The sensing systems utilze sensor data such as electormagnetic energy, acoustic energy, seismic energy, magnetic energy, infrared energy and the like.

In the presently available direction finding systems such as a phased array sensing system utilizing an amplitude direction finding scheme, the direction finding system is limited to direction finding accuracies of approximately ½ the antenna's beamwidth. In contrast, the present invention in one embodiment uses the phased array elements of a phased array direction finding system as a phase interferometer and in an alternative embodiment the present invention combines the phased array system with an adjacent phase interferometer to greatly improve the direction finding accuracies.

Figure 1:
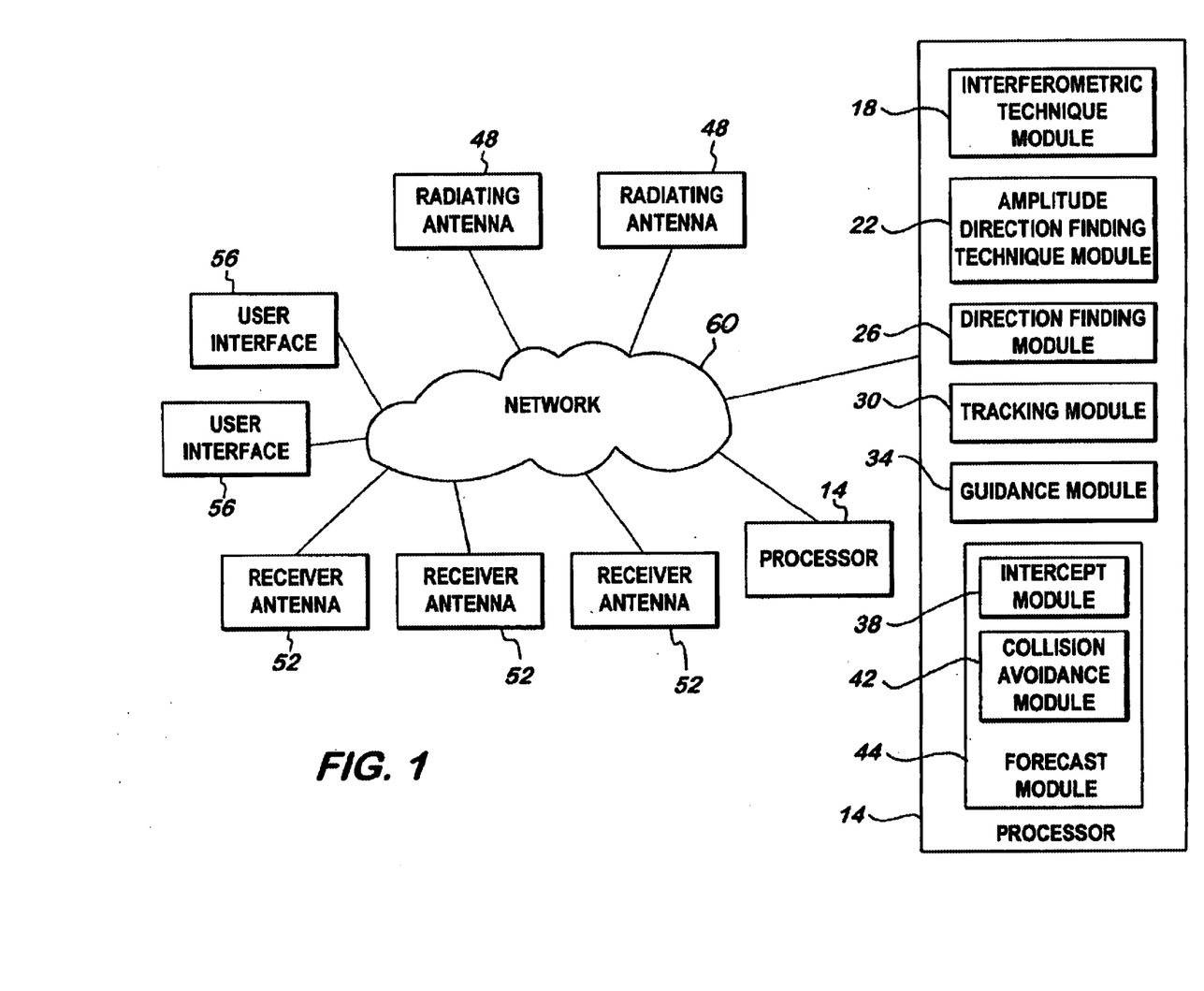
FIG. 1 is a functional block diagram illustrating a system for precision direction finding.

Theoretical Performance Improvement Provided by the Present Invention For Direction Finding ("DF") Accuracy:
1. A linear phased array utilizing 20 elements can achieve amplitude based DF accuracies of 5° (spatial degrees).
2. A phased interferometer can be calibrated to achieve 10° of phase error.
3. Resulting phased array/interferometer DF performance: [5°(spatial degrees)/360° (electrical)]*10° error (electrical) =0.1389° DF accuracies Referring now to the drawings, wherein like reference numerals designate corresponding structure throughout the views. FIG. 1 is a block diagram of a system 10 in accordance with an embodiment of the invention that includes at least one processor 14 having executing thereon different direction finding processes. Direction finding processes include interferometric technique module 18, amplitude direction finding technique module 22, direction finding module 26, tracking module 30, guidance module 34, forecast module 44, and within forecast module 44, intercept module 38 and collision avoidance module 42.

System 10 also includes at least two receiver antennas 52 for receiving the echo of the radiation reflected back from the object of interest that was illuminated or a direct or indirect transmission from the object of interest. System 10 may also includes at least one radiating antenna 48 for radiating electromagnetic radiation onto an object of interest. An antenna is any structure or device used to collect or radiate electromagnetic, acoustic, magnetic and/or seismic energy.

System 10 further includes a user interface 56 which enables the a user such as a person, fire control system, guidance system, tracking system, subsystem control system and the like to retrieve and/or input data into system 10. In addition, network 60 connects the components of system 10 and can be a wired, wireless and/or wave-guided connections.

Figure 2:
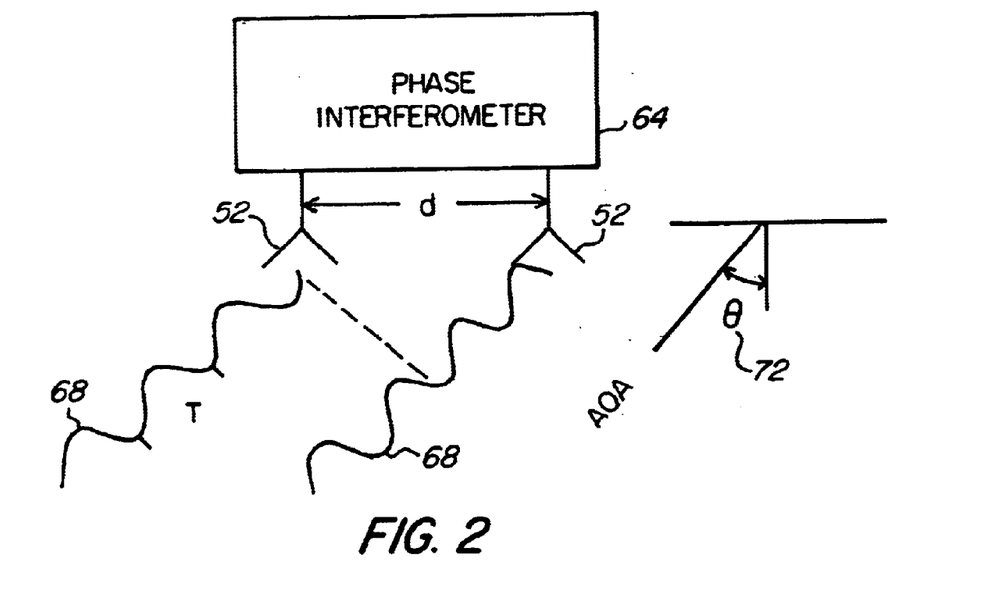
FIG. 2 is a functional block diagram illustrating an interferometric technique according to the system of FIG. 1.

Refering now to FIG. 2, interfereometric technique module 18 utilizes the techniques of FIG. 2. Phase interferometer 64 receives an echo 68, direct transmission or indirect transmission of a wave front of electromagnetic energy reflected from an illuminated or unilluminated object of interest in receiver antennas 52. Phase interferometer 64 in one embodiment uses the phased array elements of a phased array direction finding system as a phase interferometer. In an alternative embodiment of the present invention, phase interferometer 64 is a phase interferometer that is separate from the phased array.

Figure 3:
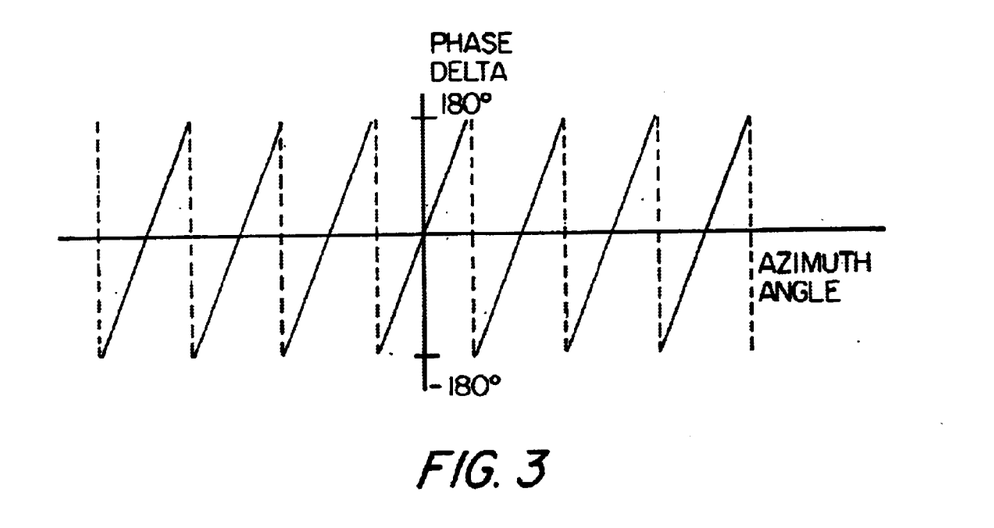
FIG. 3 is an illustrative diagram of the ambiguities presented by the interferometric technique according to the technique of FIG. 2.

The phase difference is measured by interferometric technique module 18 according to known techniques and if receiver antennas 52 spacing (d) is wide relative to the wavelength of the incoming wave, then the phase interferometer 64 can be used to measure the angle-of-arrival 72 ("AOA") ($\theta$) accurately. However, refering now to FIG. 3, the measured angle-of-arrival is also higly ambiguous because for any measured phase delta, multiple AOA's 72 are possible and a way to quickly and accurately solve this ambiguity is provided by the present invention.

Figure 4:
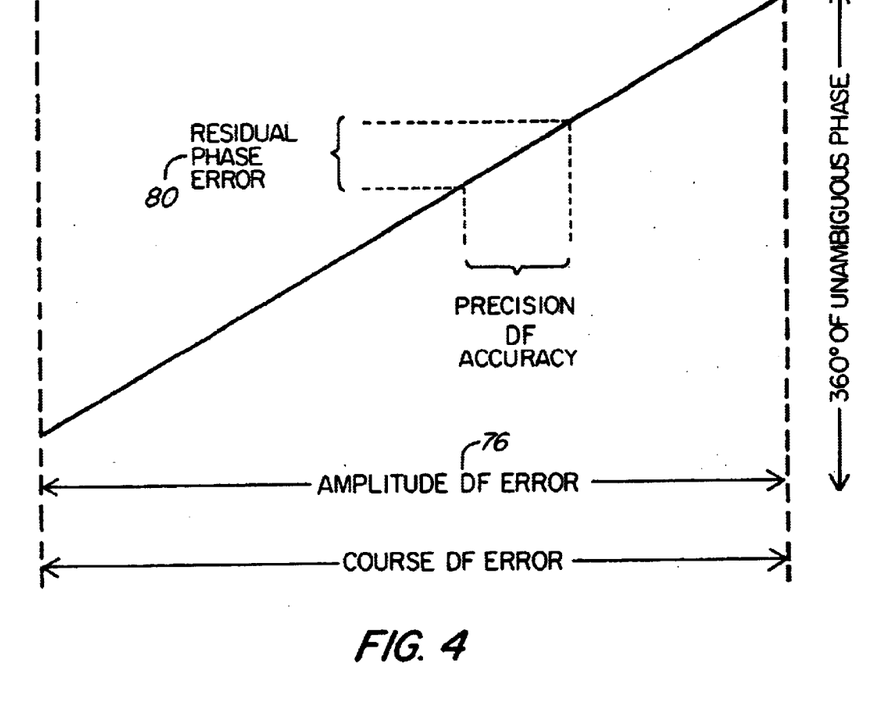
FIG. 4 is a diagram illustrating the resolution of the ambiguity problem presented in FIG. 3.

Refering now to FIG. 4, the robust ability of the a phased array antenna to do accurate amplitude based angle-of-arrival 72 measurements makes it an ideal solution to the ambiguity problem. The direction finding accuracy that can be achieved is a function of amplitude DF error 76 of the linear array and residual phase error 80 of the interferomemeteric measurement.

Theoretical Precision DF Accuracy Example:

Precision DF accuracy=[course DF accuracy/360°]*residual phase error

[course DF accuracy/360°]*residual phase error=[amplitude DF accuracy/ 360°]*residual phase error Amplitude DF accuracies that can be achieved for a linear phased array is ½ times the half power beamwidth in the dimension of the measurement.

Amplitude DF accuracy=[BW (3 dB)]/2

Substituting equations:

Precision DF accuracy=({[BW (3 dB)] 2}/360°)*residual phase error

Thus the theoretical accuracy that can be achieved with the phased array based precision direction finding system of the present invention is a function of the phased array's beamwidth and the residual phase error of the interferometric technique. Accordingly, the accuracy of the present invention can be increased by reducing the array beamwidth and the residual phase error.

Figure 5:
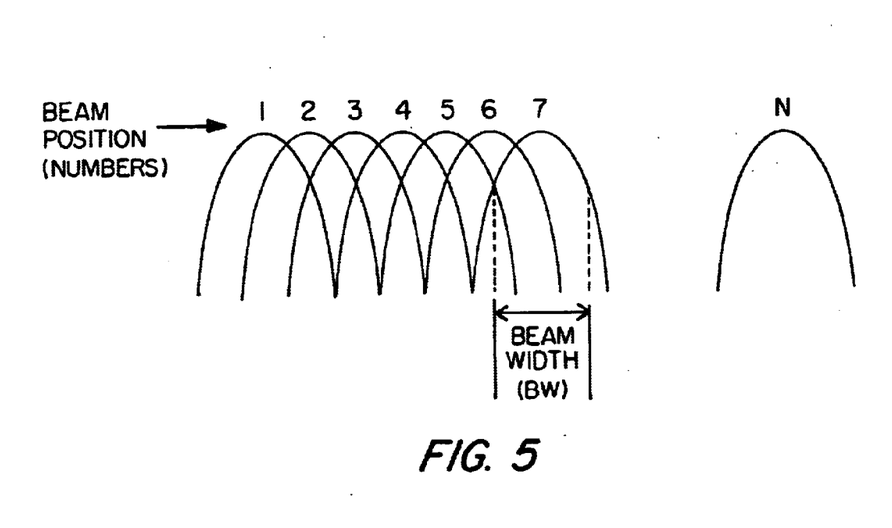
FIG. 5 is an illustrative diagram illustrating an amplitude direction finding technique according to the system of FIG. 1.

One method of amplitude direction finding used by amplitude direction finding module 22 with a linear phased array is accomplished by stepping through adjacent beam positions in 72 beamwidhts steps and making an amplitude measurment as shown in FIG. 5. The beam position with the highest measured amplitude is the angle-of-arrival 72 (AOA).

Figure 6:
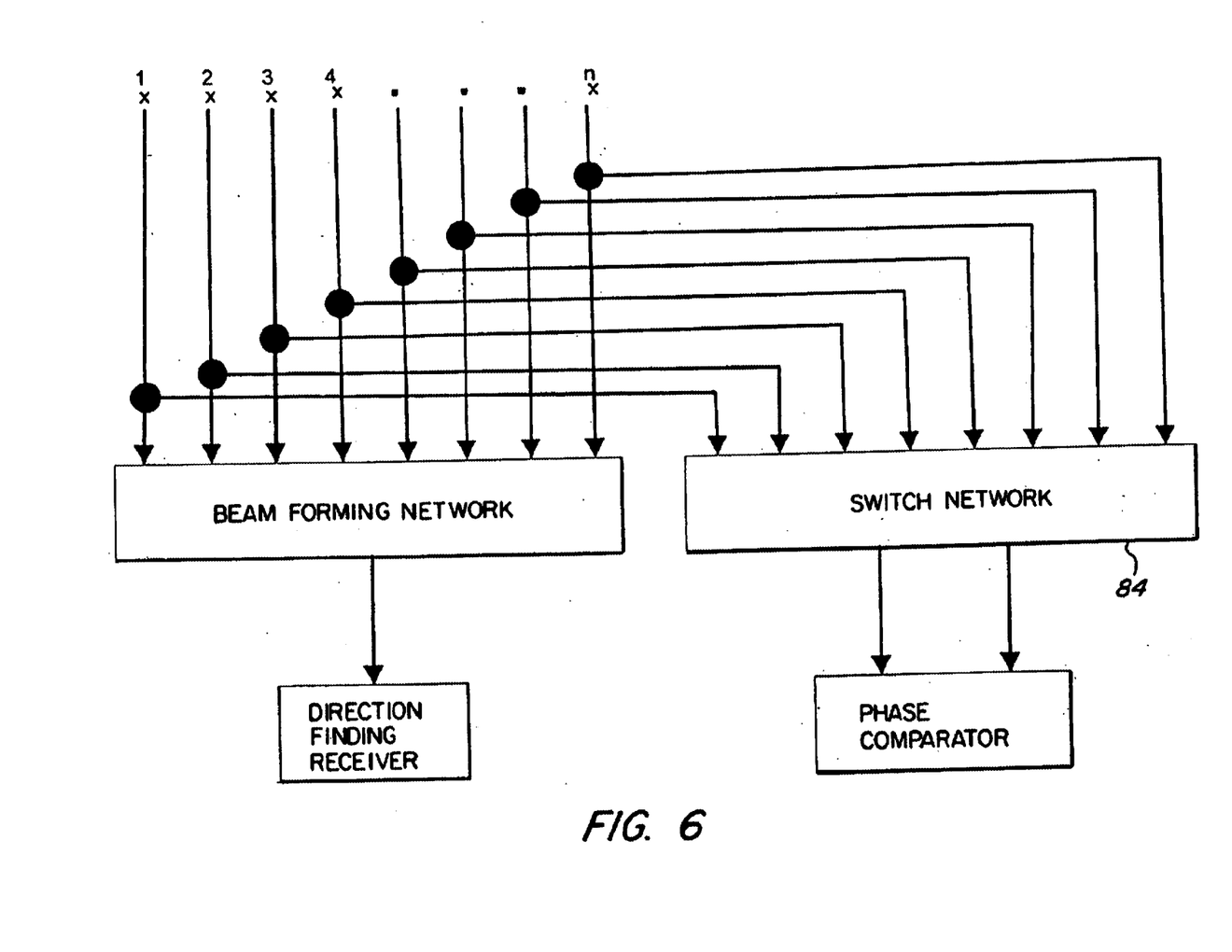
FIG. 6 is a functional block diagram illustrating a system for precision direction finding according to the system of FIG. 1.

Refering now to FIG. 6, an embodiment of the present invention architecture is shown for an azimuth based precision direction finding system using a linear phased array and the more linear elements used will result in greater accuracy in the system. Accordingly, as the linear array grows, the azimuth beamwidth narrows and therefore the amplitude direction finding performance increases. As the amplitude direction finding increases, a wider interferometer baseline can be used thereby increasing the direction finding accuracy of the system.

Refering back to the earlier example of Theoretical Performance Improvement Provided by the Present Invention For Direction Finding Accuracy, doubling of the linear array to 40 elements will half the azimuth beamwidth making 2.50 amplitude direction finding accuracies theoretically possible because a sensing's azimuth resolution depends on its antenna's beam width, which is a function of the antenna's size. An element is a unit such as an antenna, hydrophone and the like.

Theoretical Performance Improvement Provided by the Present Invention For Direction Finding Accuracy Using a 40 Element Array:

[2.5° (spatial)/360° (electrical)]*10° (electrical) error=0.0694° DF accuracy

Also, the precision direction finding architecture shown in FIG. 6 can be utilized over multi-octave bandwidths and by using switch network 84, the most optimum interferometry pair can be chosen for the center frequency that is being received.

In an alternative embodiment of the invention shown in FIG. 6, the elevation plane is included by adding a vertical precision direction finding array. In this embodiment the direction finding can be measured in both the azimuth and the elevation. And still yet in another embodiment, the linear phased array operates only in elevation.

The phased array based direction finding system shown in FIG. 6 is really a sub-system of FIG. 1. In order for a precision direction finding measurement to be made, receiver antennas 52 have to acquire the echo, the direct transmission and/or the indirect transmission generated by the object of interest and sends the acquired signal to be direction finded to processor 14. Processor 14 then predictively tracks the acquired signal in frequency-of-arrival and time-of-arrival using well established techinques. Processor 14 then controls the precision direction finding array in order to properly measure the angle-of-arrival.

To measure the angle-of-arrival, processor 14 executes amplitude direction finding technique module 22, the amplitude direction finding technique module producing amplitude direction finding technique data from the acquired signal, the amplitude direction finding technique data indicative of the course direction of the object of interest. Processor 14 also executes interferometric technique module 18 to produce interferometric technique data from the acquired signal, the interferometric technique data indicative of the object of interest's direction from the phased array sensing system.

Processor 14 also executes direction finding module 26, direction finding module 26 determining direction data of the object of interest based on residual phase error of the interferometric technique data and on an amplitude direction finding error of the amplitude direction finding technique data. Once the direction of the object of interest is determine, system 10 can employ a number of different utilies to exploit the direction data.

For example, tracking module 30 enables system 10 to establish a location or a series of locations for tracking the object of interest. System 10 also provides guidance module 34 which forms a track file based on a direction or series of directions to guide a second object to the object of interest.

System 10 also has the capacity to forecast the future direction of the object of interest utilizing forecast module 44 and well known forecasting algorithms and because of system 10's superior accuracy over present direction finding systems, system 10 can produce greater forecasting accuracy. The superior forecasting accuracy of system 10 can be utilized with intercept module 38 that will guide a second object into the object of interest and with collision avoidance module 42 that will guide a second object safely around the object of interest.

Figure 7:
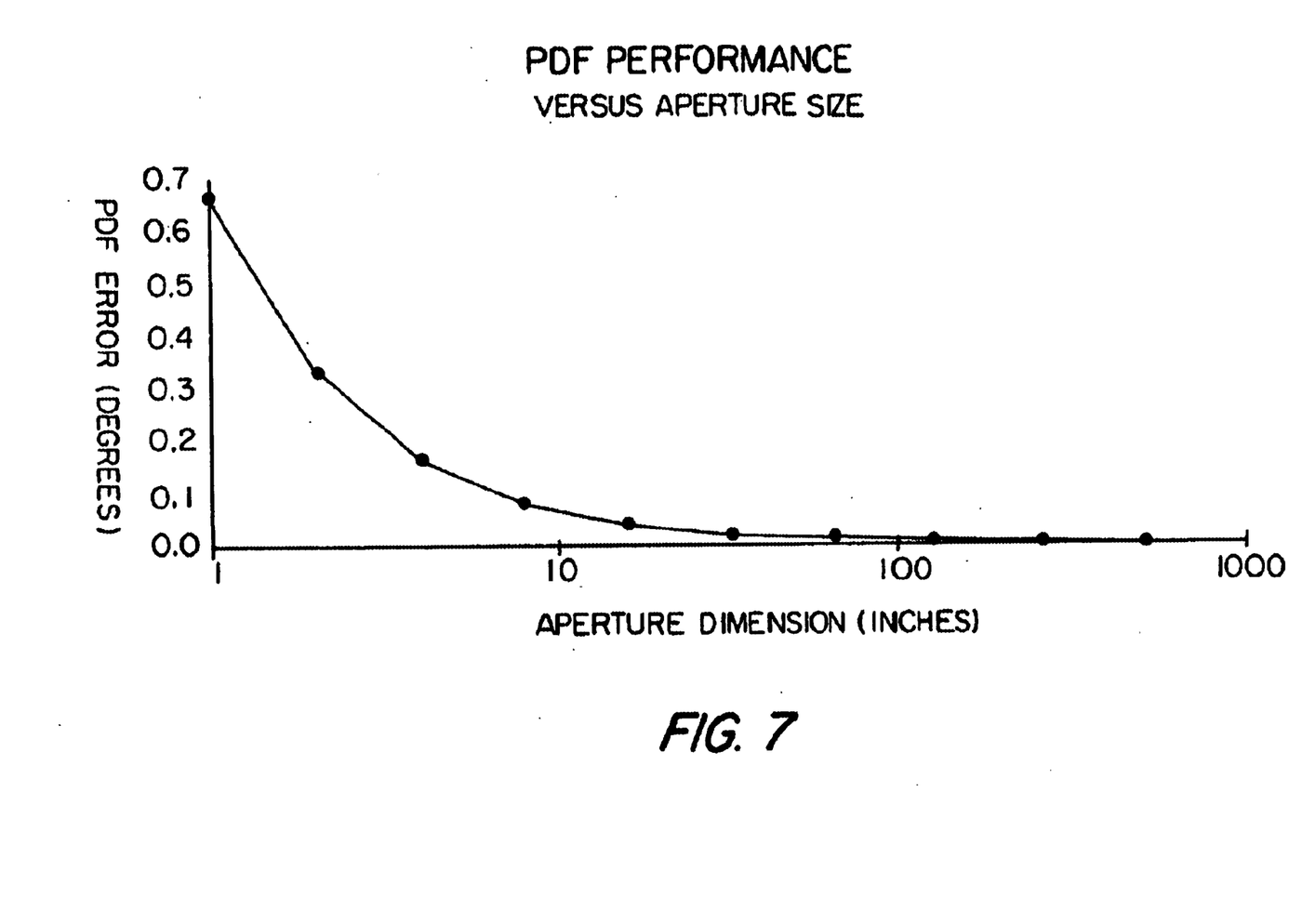
FIG. 7 is a graph illustrating theoretical values of precision direction finding performance versus aperture size according to the system of FIG. 1.

Consequently, the present invention is a revolutionary high performance Precision Direction Finding (PDF) System that is a quantum leap over present direction finding systems. The chart of FIG. 7 shows the theoretical PDF performance that can be achieved with this technology. PDF performance, in PDF error, is shown relative to the aperture size of the PDF system. PDF performance is scalable with aperture size, but even extremely small apertures of only a few inches can provide extremely high DF precision. This will enable systems to be made smaller, less complex, and cheaper than present day weapon systems. The scalability will allow the products to be tailored to the customer—less precise for international and commercial customers, more precise for DOD customers.

Applications for the capabilities provided by the present invention are numerous. The ultra-high DF precision provided by this technology will spawn a new generation of weapons. These revolutionary weapons systems will enable the DOD to address every major issue confronting the country.

Issue #1: Targeting of Highly Mobile Surface-to-Air Missile (SAM) Systems.
  Solution: This PDF technology can be incorporated into Electronic Warfare (EW) equipment to provide fast single-ship and multi-ship precision location of the SAM's so they can be instantly targeted for destruction.
Issue #2: National Missile Defense (NMD)
  Solution: "How do you kill a bullet with a bullet?" The answer is, you don't. You kill a bullet with a precisely aimed speed-of-light weapon. This PDF technology will be used to develop highly accurate sensing tracking systems that will be used to steer high-powered, speed-of-light weapons that will destroy ballistic missiles in flight.
Issue #3: Fighting the War on Terrorism
  Solution: This PDF technology will be used to terminate terrorists. The technology will be integrated into "Space-Based" super weapons that will passively target the communication systems used by the terrorists. When the terrorists step out of their caves to communicate on their radios or cell phones they will be terminated.
Issue #4: Homeland Defense
  Solution: This PDF technology will be used to develop area defense systems that will protect cities and national monuments from the same tragedy that befell the World Trade Center.
PDF Weapon System Descriptions
  Combat Search and Rescue (C-SAR) Systems
The PDF technology will be used to develop superior C-SAR systems that will be used to locate downed airman and endangered troops.
Target Platforms: All aircraft, ships, and ground vehicles used to support Search and Rescue operations
Commercial Application: The system can be demilitarized and used by the Coast Guard and the National Park Service and their counterparts around the world.
Electronic Warfare Systems
1. Electronic Support Measures (ESM) Systems
  Capabilities: Superior Situational Awareness (SA)
    Instantaneous Precision Location
  Target Platforms: Low Observable (LO) Aircraft, Non-Combat Military Aircraft 2. Electronic Attack (EA) Systems
   Capabilities: ESM
      Electronic Countermeasures (ECM)
         Self-Protection
         Support Jamming
         Stand-Off Jamming
      Information Warfare (IW)
   Target Platforms: All Combat Aircraft, High-Value Aircraft (i.e. Air Force One, AWACS, Rivet Joint, Airborne Laser (ABL), etc.), Ships, Combat Ground Vehicles
3. High-Speed Anti-Radiation Missile (HARM) Seekers
   Capabilities: Autonomous Operation (i.e. No Cueing Required)
      Signal Acquisition and Identification
      Instantaneous Precision Location
      In-Flight Target Re-direction
   Target Platforms: All Combat Aircraft, Ships, Combat Ground Vehicles, Military Installations Platform and Area Missile Defense Systems The Electronic Attack (EA) systems, described above, will be modified for active targeting. This will be accomplished by utilizing the EA systems' sensing reception and sensing jamming capabilities for a new function—Active Targeting. The precision targeting capability will be used to steer missile defense weapons:

1.) Low-Powered lasers for confusing Infrared (IR) missile seekers
2.) Medium-Powered lasers for destroying missiles seekers (IR, Radio Frequency (RF), Millimeter Wave (MMW), and Electro-Optical (EO))
3.) High-Powered lasers for destroying missiles
4.) Guns for destroying missiles
5.) Focused Chaff designed to trip the missiles' proximity fuse causing premature warhead detonation.

These new weapon systems will be used to defend against missiles of all types:
   Air-to-Air Missiles
   Surface-to-Air Missiles
   Air-to-Surface Missiles
   Air-to-Sea Missiles
   Surface-to-Surface Missiles
   Tactical Ballistic Missiles
Utilizing any type of Missile Guidance:
   IR
   RF (Semi-Active and Active)
   MMW (Semi-Active and Active)
   EO
   Laser
   Command
   Inertial
Target Platforms and Areas: All Combat Aircraft, High-Value Aircraft, Ships, Combat Ground Vehicles, Military Installations, Cities, National Monuments
These systems can also be used to destroy hostile aircraft.

National Missile Defense (NMD) Weapon Systems

The PDF technology will used to develop land based, ship based and air based weapons that destroy Strategic Ballistic Missiles in flight. Highly precise active targeting systems will be used to steer high-energy weapons that will destroy the missiles at any phase in their flight.

Target Platforms and Systems: Ground Based Missile Defense Installations, Airborne Laser (ABL), and Ship Based Missile Defense Systems (e.g. Aegis Cruiser), Space Based Weapons Space Based Weapon Systems The PDF technology will be used for passive and active targeting of Space Based Super Weapons. The targeting systems will be integrated with imaging systems and high-energy weapons.

Passive Weapons Mission:
   Support the War on Terrorism:
      Intelligence Gathering
      Terrorist Termination
   Support War Fighting:
      The weapons will be used to destroy the enemy's war fighting infrastructure at the outset of an engagement. All electromagnetic transmissions will be targeted: Radio Stations, TV Stations, Communication Systems, Data links, Commanders using cell phones, Sensings, etc. "The war is literally over in milliseconds."

Active Weapons Mission:
   Support NMD
   Protect Other Space Assets
   Support Planet Protection
      Used to knock asteroids off of a collision course with Earth.

Precision direction finding can be accomplished with other antenna designs besides phased arrays. Any highly directive antenna will work including mechanically steered high gain horn antenna, mechanically steered high gain parabolic antenna, array of high gain horns, either switched sequentially into a direction finding receiver or connected simultaneously to a bank of direction finding receivers and the like.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A sensing system with direction finding capabilities, the system comprising:
   a phased array that utilizes an amplitude direction finding scheme, said phased array sensing having at least two receiver antennas for receiving a received signal from a first object;
   at least one processor in communication with the phased array sensing, the processor executing an amplitude direction finding technique module executing on the processor, the amplitude direction finding technique module producing amplitude direction finding technique data from the received signal, the amplitude direction finding technique data indicative of the course direction of the first object and an interferometric technique module to produce interferometric technique data from the received signal, the interferometric technique data indicative of a more precise direction of the first object than provided by the amplitude direction finding technique; and
   a direction finding module executing on the processor, the direction finding module determining direction finding data of the first object based on a residual phase error of the interferometric technique data and on an amplitude direction finding error of the amplitude direction finding technique data.

2. The system of claim 1 further comprising a user interface in communication with the processor, the user interface providing a user access to the direction finding data.

3. The system of claim 2 wherein the user is selected from the group of users comprising people, fire control systems, guidance control systems, tracking systems, sub-system control systems and combinations of these.

4. The system of claim 1 wherein the received signal is a direct transmission or an indirect transmission from the first object.

5. The system of claim 1 further comprising a tracking module executing on the processor, the tracking module tracking the first object for a period of time based on the direction finding data.

6. The system of claim 1 further comprising a guidance module executing on the processor, the guidance module guiding a second object to the first object based on the first object direction finding data.

7. The system of claim 1 further comprising a forecast module executing on the processor, the forecast module providing forecast data of the future location of the first object based on the direction finding data and a projected first object course.

8. The system of claim 7 further comprising an intercept module in communications with the processor, the intercept module guiding a second object to the first object based on the forecast data of the first object's future location.

9. The system of claim 7 further comprising a collision avoidance module in communications with the processor, the collision avoidance module guiding a second object around the first object based on the forecast data of the first object's future location.

10. The system of claim 1 wherein the receiver antennas have at least one reference receiver antenna and at least one companion receiver antenna.

11. The system of claim 1 wherein the phased array configuration Is selected from the group of configurations comprising linear array, planar array, circular array, cross array, L-shaped array, Y-shaped array, X-shaped array, spiral array, dual spiral array, ring array, dual ring array, and combinations of these.

12. The system of claim 1 further comprising a switching network operating under the direction of the processor, the switching network providing the optimal receiving antennas configuration for a center frequency that is being received.

13. The system of claim 1 wherein the phased array sensing utilizes multi-octave bandwidths.

14. The system of claim 1 wherein the phased array sensing system has a reduced aperture size for a given accuracy when compared to other phased array sensing system of the same accuracy.

15. The system of claim 1 further comprising a phase interferometer in communication with the processor, the phase interferometer providing interferometer data indicative of the first object's direction from the phased array sensing.

16. The system of claim 1 further comprising at least one radiating antenna in communication with the processor, the radiating antenna for radiating radiation onto a first object.

17. The system of claim 16 wherein the received signal is an echo of the radiated radiation.

18. The system of claim 17 wherein the radiating antenna and receiver antennas are collocated.

19. The system of claim 1 wherein a single antenna performs both radiating antenna and receiver antenna functions.

20. A method of providing precision direction finding capabilities for a phased array sensing system, the method comprising:
   providing a phased array sensing system that utilizes an amplitude direction finding scheme;
   receiving a received signal from a first object in at least two receiver antennas of the phased array sensing system;
   comparing the received signal at each receiver element in a processor of the phased array sensing utilizing an amplitude direction finding technique to produce amplitude direction finding technique data, the amplitude direction finding technique data indicative of the direction of the first object;
   processing the received signal further to determine angle of arrival data based on an interferometric technique to produce interferometric technique data, the interferometric technique data indicative of a more precise direction of the first object than provided by the amplitude direction finding technique; and
   determining the direction data of the first object based on a residual phase error of the interferometric technique data and on an amplitude direction finding error of the amplitude direction finding technique data.

21. The method of claim 20 further comprising radiating electromagnetic radiation from at least one radiating antenna of the phased array sensing system onto a first object.

22. The method of claim 21 wherein the antenna and receivers are collocated.

23. The system of claim 21 wherein a single antenna performs both radiating antenna and receiver antenna functions.

24. The method of claim 20 further comprising tracking the first object for a period of time based on the direction finding data.

25. The method of claim 20 further comprising guiding a second object to the first object based on the first object direction finding data.

26. The method of claim 20 further comprising establishing forecast data of a future location of the first object based on the direction finding data and a projected first object course.

27. The method of claim 26 further comprising guiding a second object to the first object based on the forecast data of the first object's future location.

28. The method of claim 26 further comprising avoiding the first object based on the forecast data as utilized by a second object.

29. The method of claim 21 wherein the receiver antennas have at least one reference receiver antenna and at least one companion receiver antenna.

30. The method of claim 20 wherein the phased array configuration is selected from the group of configurations comprising linear array, planar array, circular array, cross array, L-shaped array, Y-shaped array, X-shaped array, spiral array, dual spiral array, ring array, dual ring array, and combinations of these.

31. The method of claim 20 further comprising providing a switching network operating under the direction of the processor, the switching network providing the optimal receiving antennas configuration for a center frequency that is being received.

32. The method of claim 20 wherein the phased array sensing system utilizes multi-octave bandwidths.

33. The method of claim 20 wherein the phased array sensing system has a reduced aperture size for a given accuracy when compared to other phased array sensing system of the same accuracy.

34. A method of providing precision direction finding capabilities for a sensing system, the method comprising:

providing a sensing system that utilizes an amplitude direction finding scheme;

receiving a received signal in at least two receivers of the energy wave sensing system, the received signal generated by a first object;

comparing the received signal at each receiver in a processor of the sensing system utilizing an amplitude direction finding technique to produce amplitude direction finding technique data, the amplitude direction finding technique data indicative of course direction of the first object;

processing the received signal further to determine angle of arrival data based on an interferometric technique to produce interferometric technique data, the interferometric data indicative of a more precise direction of the first object than provided by the amplitude direction finding technique; and determining the direction finding data of the first object based on a residual phase error of the interferometric technique data and on an amplitude direction finding error of the amplitude direction finding technique data.

35. The method of claim 34 further comprising radiating energy from at least one radiating antenna of the sensing system onto a first object.

36. The method of claim 34 wherein the antenna and receivers are collocated.

37. The system of claim 34 wherein a single antenna performs both radiating antenna and receiver antenna functions.

38. The method of claim 34 further comprising tracking the first object for a period of time based on the direction finding data.

39. The method of claim 34 further comprising guiding a second object to the first object based on the first object direction finding data.

40. The method of claim 34 further comprising establishing forecast data of a future location of the first object based on the direction finding data and a projected first object course.

41. The method of claim 40 further comprising guiding a second object to the first object based on the forecast data of the first object's future location.

42. The method of claim 40 further comprising avoiding the first object based on the forecast data as utilized by a second object.

43. The system of claim 35 wherein the receiver antennas have at least one reference receiver antenna and at least one companion receiver antenna.

44. The method of claim 34 wherein the sensing system configuration is selected from the group of configurations comprising linear array, planar array, circular array, cross array, L-shaped array, Y-shaped array, X-shaped array, spiral array, dual spiral array, ring array, dual ring array, and combinations of these.

45. The method of claim 34 further comprising providing a switching network operating under the direction of the processor, the switching network providing the optimal receiving antennas configuration for a center frequency that is being received.

46. The method of claim 34 wherein the sensing system utilizes multi-octave bandwidths.

47. The method of claim 34 wherein the sensing system has a reduced aperture size for a given accuracy when compared to other sensing system of the same accuracy.

48. The method of claim 34 wherein the sensing system sensing data type is selected from the group of data types comprising electromagnetic, acoustic, seismic and combinations of these.

* * * * *

UNITED STATES PATENT AND TRADEMARK OFFICE
CERTIFICATE OF CORRECTION

PATENT NO.   : 6,839,025 B1
DATED        : January 4, 2005
INVENTOR(S)  : Kenneth M. Reigle It is certified that error appears in the above-identified patent and that said Letters Patent is hereby corrected as shown below:

<u>Title page,</u>
Item [76], Inventor, should read -- Ken Reigle, 333 River St., Apt, 522, Hoboken, NJ (US) 07030 --

Signed and Sealed this

Twenty-second Day of March, 2005

JON W. DUDAS
*Director of the United States Patent and Trademark Office*